(12) United States Patent
Hofer

(10) Patent No.: US 10,107,693 B2
(45) Date of Patent: Oct. 23, 2018

(54) TEMPERATURE SENSING APPARATUS AND METHOD OF MEASURING A TEMPERATURE OUTSIDE A HOUSING

(71) Applicant: SIEMENS SCHWEIZ AG, Zurich (CH)

(72) Inventor: Remy Hofer, Ebikon (CH)

(73) Assignee: Siemens Schweiz AG, Zurich (CH)

( * ) Notice: Subject to any disclaimer, the term of this patent is extended or adjusted under 35 U.S.C. 154(b) by 312 days.

(21) Appl. No.: 14/604,913

(22) Filed: Jan. 26, 2015

(65) Prior Publication Data

US 2015/0211937 A1    Jul. 30, 2015

(30) Foreign Application Priority Data

Jan. 24, 2014    (EP) .................................. 14152421

(51) Int. Cl.
| | |
|---|---|
| *G01K 1/20* | (2006.01) |
| *G01K 3/08* | (2006.01) |
| *G01K 3/02* | (2006.01) |
| *G01K 13/00* | (2006.01) |
| *G01K 1/08* | (2006.01) |
| *G01K 7/42* | (2006.01) |

(52) U.S. Cl.
CPC ................. *G01K 1/08* (2013.01); *G01K 1/20* (2013.01); *G01K 7/42* (2013.01)

(58) Field of Classification Search
CPC .. G01K 1/00; G01K 3/06; G01K 3/14; G01K 1/16; G01K 1/12; G01K 17/06; G01K 1/20; G06F 15/00

USPC ... 374/137, 100, 29, 30, 141, 152, 148, 208, 374/110; 702/130

See application file for complete search history.

(56) References Cited

U.S. PATENT DOCUMENTS

| | | | |
|---|---|---|---|
| 4,326,780 A * | 4/1982 | Kim ......................... | G01K 5/70 340/594 |
| 4,537,068 A * | 8/1985 | Wrobel ..................... | G01P 5/12 73/204.15 |
| 4,741,476 A | 5/1988 | Russo et al. | |

(Continued)

FOREIGN PATENT DOCUMENTS

| | | |
|---|---|---|
| CN | 1670488 A | 9/2005 |
| CN | 201060054 Y | 5/2008 |

(Continued)

OTHER PUBLICATIONS

NN8707497. Title: Air Flow Characterization in Vertical Laminar Flow Clean Rooms. No date.*

*Primary Examiner* — Gail Kaplan Verbitsky
(74) *Attorney, Agent, or Firm* — Laurence Greenberg; Werner Stemer; Ralph Locher

(57) ABSTRACT

A method for measuring a temperature outside a housing unit includes the steps of measuring a first temperature inside the sealed housing of the housing unit, measuring a second temperature inside the sealed housing of the housing unit, and measuring a airflow speed outside the housing of the housing unit and along the front cover of the housing. A multiple of the difference between the first temperature and the second temperature is added to the first temperature, and a multiple of the product of airflow speed $|v_A|$ and the difference between the first temperature and the second temperature is further added.

2 Claims, 1 Drawing Sheet

(56) References Cited

U.S. PATENT DOCUMENTS

| | | | | |
|---|---|---|---|---|
| 4,807,151 A * | 2/1989 | Citron | | G01F 1/6965 |
| | | | | 123/494 |
| 5,710,380 A * | 1/1998 | Talley | | G01P 5/12 |
| | | | | 73/861.85 |
| 6,122,678 A | 9/2000 | Eckel et al. | | |
| 6,798,341 B1 | 9/2004 | Eckel et al. | | |
| 7,027,834 B2 * | 4/2006 | Soini | | H04M 1/21 |
| | | | | 340/501 |
| 8,734,007 B2 * | 5/2014 | Campbell | | G01F 25/0007 |
| | | | | 374/1 |
| 8,740,454 B2 * | 6/2014 | Takei | | G01K 3/06 |
| | | | | 374/102 |
| 8,954,288 B2 * | 2/2015 | Aljabari | | G01K 1/20 |
| | | | | 374/110 |
| 9,564,686 B2 * | 2/2017 | Cho | | H01Q 1/243 |
| 2005/0209813 A1 | 9/2005 | Kautz et al. | | |
| 2009/0233514 A1 * | 9/2009 | Lee | | B32B 37/065 |
| | | | | 445/25 |
| 2010/0275683 A1 * | 11/2010 | Jia | | G01P 5/14 |
| | | | | 73/170.14 |
| 2010/0305918 A1 * | 12/2010 | Udell | | F24J 3/081 |
| | | | | 703/2 |
| 2011/0119018 A1 * | 5/2011 | Skarp | | G01K 7/42 |
| | | | | 702/130 |
| 2012/0185202 A1 * | 7/2012 | Aljabari | | G01K 1/20 |
| | | | | 702/130 |
| 2012/0307861 A1 * | 12/2012 | Takei | | G01K 3/06 |
| | | | | 374/102 |
| 2013/0078917 A1 * | 3/2013 | Cho | | H01Q 1/243 |
| | | | | 455/41.1 |
| 2013/0099008 A1 | 4/2013 | Aljabari et al. | | |
| 2013/0107905 A1 * | 5/2013 | Campbell | | G01F 25/0007 |
| | | | | 374/1 |
| 2013/0194735 A1 * | 8/2013 | Kajiya | | H05K 5/061 |
| | | | | 361/679.01 |
| 2014/0254623 A1 * | 9/2014 | Paielli | | G01N 25/72 |
| | | | | 374/10 |
| 2014/0376591 A1 * | 12/2014 | Geisler | | G01K 7/427 |
| | | | | 374/137 |
| 2015/0124853 A1 * | 5/2015 | Huppi | | G01K 1/16 |
| | | | | 374/142 |
| 2015/0280771 A1 * | 10/2015 | Mow | | H01Q 1/243 |
| | | | | 455/77 |
| 2016/0131541 A1 * | 5/2016 | Kim | | H04N 5/23241 |
| | | | | 374/152 |
| 2016/0265800 A1 * | 9/2016 | Modi | | F24F 11/0086 |
| 2016/0270252 A1 * | 9/2016 | Miura | | H01L 23/427 |

FOREIGN PATENT DOCUMENTS

| | | | | |
|---|---|---|---|---|
| CN | 201166562 Y | | 12/2008 | |
| CN | 201608990 U | * | 10/2010 | |
| CN | 102778009 A | | 11/2012 | |
| CN | 102889674 A | | 1/2013 | |
| CN | 204855118 U | * | 12/2015 | |
| DE | 19728803 C1 | | 8/1999 | |
| GB | 2409366 A | * | 6/2005 | ............ B29C 49/04 |
| JP | 2003272828 A | * | 9/2003 | |
| JP | 3186137 U | * | 9/2013 | |
| WO | 9960354 A1 | | 11/1999 | |
| WO | WO 2007131998 A1 | * | 11/2007 | ............ G01K 1/20 |

* cited by examiner

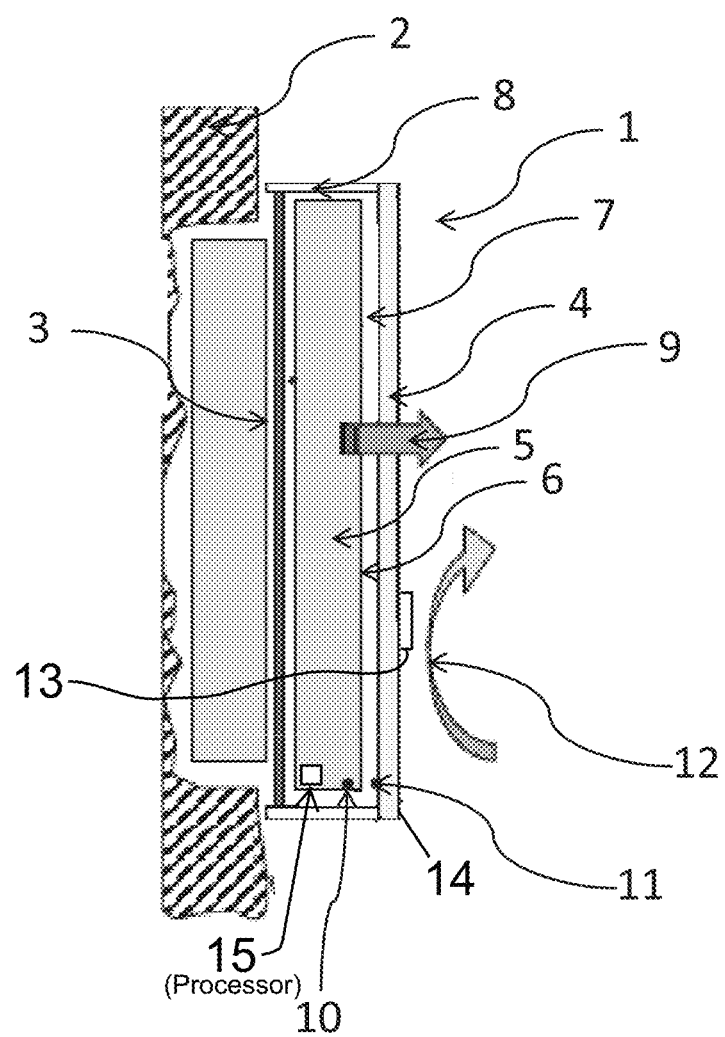

TEMPERATURE SENSING APPARATUS AND METHOD OF MEASURING A TEMPERATURE OUTSIDE A HOUSING

CROSS-REFERENCE TO RELATED APPLICATION

This application claims the priority, under 35 U.S.C. § 119, of European patent application EP 14 152 421.5, filed Jan. 24, 2014; the prior application is herewith incorporated by reference in its entirety.

BACKGROUND OF THE INVENTION

Field of the Invention

The present disclosure relates to improved temperature sensing for an electric apparatus. The present disclosure focuses on temperature sensing to measure temperatures outside a housing unit.

The latest generation of housing units for building automation systems becomes ever more compact. Users these days demand housing units with flat designs, so the thickness of these devices tends to decrease. Difficulties due to these design requirements can, at least in part, be overcome by employing sandwich designs. Accordingly, a housing unit is made up of several layers that are stacked one on top of another. At the same time, the technical complexity of these units increases.

An increase in technical complexity yields more components such as microprocessors and higher overall power consumption. Higher overall power consumption also contributes to higher thermal losses inside a housing unit. In addition, added electric components mean that additional components may obstruct any natural flow of air through the device. These developments result in undesirable side effects, so they necessitate additional efforts for cooling a device. A more compact design of today's housing units further aggravates the situation, since losses occur inside a unit with a smaller volume. Consequently, the dissipation of heat per volume of a housing unit increases dramatically.

It is common for housing units to also measure temperatures. The temperatures are then sent to a room automation system which controls heating, ventilation, air conditioning, lighting, window blinds etc. An accurate measurement of the temperature inside a room is essential in order for a room automation system to work as expected.

Early designs tended to have a temperature probe arranged inside a housing unit. The temperature probe used to be exposed to a direct flow of air. A temperature measurement inside a housing unit was accurate so long as air flow through the device was sufficient and heat dissipation inside the device was reasonably low. The temperature inside a housing unit then was at least close enough to the actual temperature inside a building.

The situation now changes with the advent of new, highly compact and technically more complex housing units. The flat design of today's housing units essentially prevents convective heat exchange between a housing unit and its environment. A temperature measurement inside a housing unit now reflects the heat dissipated inside the unit rather than the temperature inside a building.

A common approach to overcome the above difficulties is the use of forced air cooling. Forced air cooling means that a fan is installed inside a housing unit. The fan then generates sufficient flow of air through the device. This solution is not acceptable in environments where noise is undesirable. Further, a fan adds another component that is prone to mechanical or electrical failure.

Any natural flow of air through a unit may be improved on by adding slots or orifices to the housing or by making existing slots wider. These measures yield an extra flow of air through the housing, so there will be more convective heat exchange. Unfortunately, in housing units with flat designs slots and orifices are problematic because of reduced overall thickness.

Heat dissipation inside a housing unit can also decrease by choosing electric components with low thermal losses. This approach has negative implications in terms of cost-effectiveness and in performance.

Further, heat exchange between a housing unit and its environment may improve by adjustment of the distance between a housing unit and any adjacent walls. Heat exchange may also improve due to increased thickness of a device, so the distance to the surface of an adjacent wall will grow. This measure offers distinct advantages to end customers in terms of accurate temperature measurements. It actually entails the aforementioned disadvantages such as poor aesthetics. Today's end customers demand housing units with flush mounting to the surface of a wall. Actually, a manufacturer of housing units seeks to design units so they will function reliably under a wide range of environmental conditions.

SUMMARY OF THE INVENTION

It is accordingly an object of the invention to provide a temperature sensing apparatus which overcomes the above-mentioned and other disadvantages of the heretofore-known devices and methods of this general type and avoid, or at least mitigate, the aforementioned difficulties and to provide a housing unit with temperature sensing, so that the housing unit meets the aforementioned requirements.

With the foregoing and other objects in view there is provided, in accordance with the invention, a housing unit, comprising:

a housing having a front cover;

an electronic assembly disposed inside the housing, the electronic assembly dissipating heat in operation;

a first temperature sensor inside the housing;

a second temperature sensor inside the housing and disposed at a spacing distance from the first temperature sensor such that the first and second sensors measure mutually different temperatures caused by a flow of heat from the electronic assembly towards the front cover;

the housing being sealed against an ambient surroundings such that any impact on a reading of the sensors caused by a flow of air into or out of the housing is minimized or eliminated.

The present disclosure is based on the discovery that a temperature measurement becomes more accurate by considering airflow speeds on the surface of a housing unit.

It is an object of the present disclosure to provide a housing unit with a temperature sensing apparatus, so temperatures outside the unit are measured accurately. The temperature sensing apparatus shall be compatible with housing units with flat design. The temperature sensing apparatus shall also accurately determine temperatures where the housing of a housing unit provides no slots or orifices. The temperature sensing apparatus shall be part of a housing unit whose housing is sealed against any ingress of moisture and dust. Further, the temperature sensing apparatus of the housing unit shall be configured to compensate for the influence of airflow speeds on the surface of the unit.

The above problems are resolved by a temperature sensing apparatus of a housing unit and by a method according to the independent claims of this disclosure. Preferred embodiments of the present disclosure are covered by the dependent claims.

It is also an object of the present disclosure to provide a housing unit with temperature sensing wherein the front cover of the housing unit is transparent and is made of glass or of plastics.

It is another object of the present disclosure to provide a housing unit with temperature sensing wherein the housing unit provides a display such as a liquid-crystal display.

It is a related object of the present disclosure to provide a housing unit with temperature sensing wherein the display is arranged behind a front cover made of glass or of plastics.

It is yet another object of the present disclosure to provide a housing unit that is configured to measure airflow speeds and to deliver its measurements to a room automation system.

With the above and other objects in view there is also provided, in accordance with the invention, a method for measuring a temperature outside a housing unit having a sealed housing. The method comprises:

measuring a first temperature inside the sealed housing of the housing unit;

measuring a second temperature inside the sealed housing of the housing unit;

measuring an airflow speed of an airflow outside said sealed housing of said housing unit and along a front cover of the sealed housing;

determining a difference between the first temperature and the second temperature;

adding to or subtracting from the first temperature a multiple of the difference between the first temperature and the second temperature; and adding or subtracting a multiple of a product of the airflow speed $|v_A|$ and the difference between the first temperature and the second temperature.

Finally, there is provided, in accordance with the invention, a non-transitory, tangible computer readable medium having instructions executable by a processor for performing the method as outlined herein when the instructions are executed by the processor.

Other features which are considered as characteristic for the invention are set forth in the appended claims.

Although the invention is illustrated and described herein as embodied in Temperature sensing apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The sole FIGURE of the drawing shows a cutaway view of a housing unit with temperature sensing according to the invention.

DETAILED DESCRIPTION OF THE INVENTION

Referring now to the FIGURE of the drawing in detail there is shown a housing unit 1 mounted to the wall 2 of a building. The housing unit 1 shown on the FIGURE is partly installed in-wall. Most parts 4-7 of the unit 1 are, however, mounted on-wall.

The unit comprises a front cover 4. The front cover 4 is preferably made of glass and/or of any other (transparent) polymer. An electronic assembly 5 is arranged behind the front cover 5. The electronic assembly 5 in the preferred, exemplary embodiment comprises elements such as a printed circuit board and/or a microprocessor 15 and/or sensors and/or a (wireless) communication module. A preferred embodiment has a display 6 mounted on top of the electronic assembly 5, such that the display 6 is visible through the front cover 4. Typically, the display 6 is a liquid-crystal display or a display made up of organic light emitting diodes.

The display 6 and the front cover 4 are separated by a gap 7. The gap 7 is typically air-filled. In another embodiment, the gap 7 is (predominantly) filled with helium or with nitrogen.

The housing of the housing unit 1 also comprises side-walls 8. The side-walls 8 of the housing seal the housing unit 1 against any ingress of moisture or of dust. To that end, the side-walls 8 provide no slots or orifices. In other words, the housing unit 1 provides walls that substantially seal the unit from all sides, so no moisture or dust can settle inside the unit. The housing unit 1 does not need to be water-proof or hermetically sealed. It is, however, essential that any temperature measurement inside the unit 1 is not influenced by a flow of air into or out of the unit 1.

The temperature measurement as disclosed in this document is based on the heat inside the housing unit 1. In a particular embodiment, heat is predominantly dissipated by the electronic assembly 5. An arrow 9 indicates the direction of the flow of heat from the inside of the housing unit 1 through the front cover 4 to the outside of the unit 1. There is naturally also a flow of heat in the other direction from the electronic assembly 5 to the wall 2.

The housing unit 1 further comprises two temperature sensors 10, 11. A first temperature sensor 10 is ideally arranged underneath or just outside the display 6. The temperature sensor 10 may also installed adjacent to or inside of the electronic assembly 5. The temperature sensor 10 as shown in the FIGURE is close to a side-wall. In another embodiment, the temperature sensors 10, 11 are arranged closer to the center of the housing unit 1. A placement of the sensors 10, 11 closer to the center of the housing unit 1 will mitigate any adverse effect of heat flow through a side-wall.

The temperature sensors 10, 11 are preferably spaced 10 mm apart, more preferably 5 mm apart, and yet more preferably 2 mm apart. The distance between the sensors 10, 11 is large enough, so the temperature drop between the sensors can be measured accurately.

A second temperature sensor 11 is preferably installed underneath the front cover 4. In this position, the sensor 11 is in direct contact with the fluid (air) inside the gap 7. The temperature sensor 11 may also be arranged inside the front cover 4, so there will be no direct contact to any fluid inside the gap 7.

The temperature sensors 10, 11 are preferably thermocouples, or positive thermal resistance elements, or negative thermal resistance elements. The temperature sensors 10, 11 may also be optical sensors rather than electric elements. Optical sensors are typically connected through fiber optics rather than through electric wires. It is also possible to measure the temperature via Raman scattering.

The ambient temperature $T_A$ outside the housing unit 1 also depends on the airflow speed $v_A$, or wind speed, outside the unit 1. The ambient airflow $v_A$ is indicated in the FIGURE by an arrow 12. By taking into account ambient airflow, the temperature $T_A$ reads $$T_A = T_D - c_1 \cdot (T_S - T_D) + c_2 \cdot |v_A| \cdot (T_S - T_D),$$

where $T_D$ denotes the temperature measured by the sensor 11 and $T_S$ denotes the temperature measured by the sensor 10. The above relationship says the temperature $T_A$ outside the housing unit depends on the difference $T_S - T_D$ between the measurements taken from the sensors 10 and 11. The above relation further implies the temperature $T_A$ is a function of the magnitude of ambient airflow. $T_A$ is considered independent of the direction of ambient airflow.

The constants $c_1$ and $c_2$ are determined numerically and by experimentation. A series of measurements is carried out in a laboratory with well-defined airflow speeds $v_A$ and with well-defined ambient temperatures $T_A$. The temperatures $T_S$ and $T_D$ are then measured inside the housing. By fitting the measured values on a computer, the constants $c_1$ and $c_2$ are determined. This procedure is preferably carried out separately for each arrangement of temperature sensors 10, 11.

Experimentation shows that one of the advantages of the present temperature measurement is speed. Earlier solutions relied on heat exchange between a temperature probe inside a housing unit 1 and the ambient. Typical time constants were in the range of minutes, with 15 minutes being a typical value. The method and the sensing apparatus proposed herein allow for a temperature measurement that is much faster. A typical time constant is now 2.5 minutes. Time constants below one minute become technically feasible.

To determine the ambient temperature $T_A$ in accordance with the above equation, the magnitude of airflow speed $v_A$ needs to be factored in. A measurement of airflow speed $v_A$ is possible by application of the Bernoulli principle. According to this principle, a flow of air along the surface of the front cover 4 causes a pressure drop in a conduit perpendicular to that surface. The airflow speed is then calculated based on the magnitude of the pressure drop (or pressure rise) in the perpendicular conduit.

Windmill anemometers also allow for a determination of ambient airflow. A propeller could, for instance, be installed on the surface of the front cover 4. The angular speed of the propeller and/or the torque applied to the propeller then become a measures of airflow speed $v_A$.

Sonic anemometers can also deliver accurate airflow speed measurements. Sonic anemometers rely on the time of flight of a sonic pulse. In order for a sonic anemometer to be included in the present housing unit, a pair of transducers is arranged on the front cover. Typically, this pair of transducers is spaced 10 cm to 20 cm apart.

A hot-wire anemometer 13 is yet another technical means to determine airflow speeds. In order to implement a hot-wire anemometer 13 in a housing unit 1, an electric conductor is arranged on the surface 14 of the front cover 4. In a preferred embodiment, the conductor is a film of $TiO_2$ or of ZnO. The conductor is preferably covered by a thin non-conductive coating. The non-conductive coating reduces measurement errors due to moisture, dust, grease etc. At the same time, the coating is thin enough, so the conductor is cooled effectively through any ambient airflow along the surface of the front cover.

The conductor of the hot-wire anemometer 13 is arranged at a distance from the temperature sensors 10, 11. This particular arrangement reduces heating of the temperature sensors 10, 11 and thus reduces false readings due to the influence of the conductor.

A ZnO or $TiO_2$ conductor on the surface may also be employed for a direct measurement of ambient temperature. The resistance of the conductor is also a function of temperature. Consequently, ambient temperature may be calculated from the resistance of the conductor.

In yet another embodiment, airflow speed is not measured by the housing unit 1 itself but by a component of a room automation system. The latter component is separate from the housing unit 1. The latter component may be the room automation system itself.

It seems worth stressing that the above procedure for determining the constants $c_1$ and $c_2$ may also have to be carried out separately for different anemometers.

It is yet another advantage of the present disclosure that a housing unit 1 now also measures airflow speed $v_A$. In certain embodiments, an anemometer will even determine the direction of ambient airflow. A measurement of airflow speed (and possibly of wind direction) is yet another measurement value to be sent from a housing unit 1 to a room automation system. The airflow speed value may then support the decision making process inside the room automation system. In other words, the control of blinds, of lighting, of heating, of ventilation etc will become more accurate and more reliable.

The calculations, the data sampling of temperature and airflow speed, the methods, and the processing steps described in the present application may be performed by a software executed by a general purpose processor or by a digital signal processor (DSP), by an application specific integrated circuit (ASIC), by a field programmable gate array (FPGA), by discrete components or any combination thereof. Different hardware and/or software components may be used for performing the functions of the different blocks, and even with a single block.

Steps of a method according to the present application may thus be embodied in hardware, in a software module executed by a processor, or in a combination of the two. The software may include a firmware, a hardware driver run in the operating system, or an application program. Thus, the invention also relates to a computer program product for performing the operations presented herein. If implemented in software, the functions described may be stored as one or more instructions on a computer-readable medium. Some examples of storage media that may be used include random access memory (RAM), read only memory (ROM), flash memory, EPROM memory, EEPROM memory, registers, a hard disk, a removable disk, other optical disks, or any available media that can be accessed by a computer or any other IT equipment and appliance.

The processor can be configured for calculating the temperature outside said housing by further adding or subtracting a multiple of the temperature difference between said first and second sensors, the multiple scaling multiplicatively with the absolute value of the airflow speed $|v_A|$, an increase in the absolute value of the airflow speed $|v_A|$ by a given percentage yielding an increase in the multiple by the given percentage.

It should be understood that the foregoing relates only to certain embodiments of the invention and that numerous changes may be made therein without departing from the spirit and the scope of the invention as defined by the following claims. It should also be understood that the invention is not restricted to the illustrated embodiments and that various modifications can be made within the scope of the following claims.

The following is a summary list of reference numerals and the corresponding structure used in the above description of the invention:

1 housing unit
2 wall
3 part of the housing unit installed in-wall
4 front cover
5 electronic assembly
6 display
7 gap
8 side-wall of the housing
9 direction of heat flow
10 temperature sensor
11 temperature sensor
12 airflow speed on the surface of the housing unit

The invention claimed is:

1. A housing unit, comprising:
a housing having a front cover;
an electronic assembly disposed inside said housing, said electronic assembly dissipating heat in operation;
a first temperature sensor inside said housing;
a second temperature sensor inside the housing and disposed at a spacing distance from said first temperature sensor such that said first and second sensors measure mutually different temperatures caused by a flow of heat from said electronic assembly towards said front cover;
an anemometer configured to measure airflow speed outside said housing;
a processor configured for calculating the temperature outside said housing by further adding or subtracting a multiple of the temperature difference between said first and second sensors, the multiple scaling multiplicatively with the absolute value of the airflow speed $|v_A|$, an increase in the absolute value of the airflow speed $|v_A|$ by a given percentage yielding an increase in the multiple by the given percentage; and
a display;
said housing being sealed against an ambient surroundings such that any impact on a reading of said sensors caused by a flow of air into or out of said housing is minimized or eliminated;
wherein a temperature outside said housing is calculated based on exactly three measurable quantities, the exactly three measurable quantities being a temperature measured by said first sensor, a temperature measured by said second sensor, and the airflow speed measured by said anemometer.

2. A housing unit, comprising:
a housing having a front cover;
an electronic assembly disposed inside said housing, said electronic assembly dissipating heat in operation;
a first temperature sensor inside said housing;
a second temperature sensor inside the housing and disposed at a spacing distance from said first temperature sensor such that said first and second sensors measure mutually different temperatures caused by a flow of heat from said electronic assembly towards said front cover;
an anemometer configured to measure airflow speed outside said housing and configured to determine a direction of ambient air flow;
a processor configured for calculating the temperature outside said housing by further adding or subtracting a multiple of the temperature difference between said first and second sensors, the multiple scaling multiplicatively with the absolute value of the airflow speed $|v_A|$, an increase in the absolute value of the airflow speed $|v_A|$ by a given percentage yielding an increase in the multiple by the given percentage; and
a display;
said housing being sealed against an ambient surroundings such that any impact on a reading of said sensors caused by a flow of air into or out of said housing is minimized or eliminated.

* * * * *